United States Patent [19]
Atkinson

[11] 4,389,065
[45] Jun. 21, 1983

[54] WEED AND GRASS PULLER

[76] Inventor: Wallace E. Atkinson, Rte. 3, Box 656, Petersburg, Va. 23803

[21] Appl. No.: 315,042

[22] Filed: Oct. 26, 1981

[51] Int. Cl.³ .............................................. A01B 1/18
[52] U.S. Cl. ..................................... 294/50.8; 294/51
[58] Field of Search .................... 294/50.8, 50.6, 50.9, 294/51, 106, 118, 119; 172/371; 56/400.12, 400.19, 400.17, 400.04, 400.01

[56] References Cited
U.S. PATENT DOCUMENTS

| | | | |
|---|---|---|---|
| 325,212 | 8/1885 | Kohler | 294/50.8 |
| 2,352,320 | 6/1944 | Hatch | 294/50.6 |
| 4,057,277 | 11/1977 | Burkholder | 294/50.8 |

Primary Examiner—James B. Marbert
Attorney, Agent, or Firm—Munson H. Lane, Jr.

[57] ABSTRACT

A plier type composite implement for removal of relatively deeply embedded weeds and grasses has jaws with relatively soft face pads thereon to inhibit crushing, cutting or tearing and to facilitate uniform pulling forces, and the handle ends thereof have a space or trowel-like element on the one end and a hoe or rake-like element on the other end.

5 Claims, 7 Drawing Figures

WEED AND GRASS PULLER

BRIEF DESCRIPTION OF THE INVENTION

The invention relates to an implement for the removal of weeds and unwanted grasses, such as wire and Bermuda grasses, from garden vegetable patches and cultivated beds such as a flower bed, a seed bed and a flower transport bed and the like.

More particularly the invention relates to a tool for removal of generally the entire tap root or root system, of such undesirable growth, which have become relatively deeply embeeded.

BACKGROUND OF THE INVENTION

A common problem with poorly tended vegetable patches, flower beds, seed beds, plant transport beds and the like is the growth of weeds and unwanted grasses. These problem growths develop roots which extend to a depth of 2 to 6 inches or more. Lack of cultivation for instance or too early an application of a solid covering of mulch may lead to an overrun of said growths which tend to deprive the crop plant of growth space, food, moisture, sunlight and aeration.

Removal of the well rooted overrun presents a problem in that the conventional implement such as hoe, rake or cultivator is inappropriate for the purpose because of the presence of crop plants, the root depth of the weed or grass and possible intertwining of the latter root with that of the crop plant roots.

Pulling by hand and pulling with known puller implements present problems because of difficulty in grasping at the root section, because pulling at an upper section leads to root separation and because as designed the known implements crush, cut or tear, do not provide for the transmission of uniform pulling forces and thus lead to root separation.

PRIOR ART

In the latter connection, the weed puller implements of U.S. Pat. No. 97,399 to Holmes, Nov. 30, 1869 and U.S. Pat. No. 626,966 to Conzett, June 13, 1899 are each adapted to operate at substantially ground surface level and for reasons as above the use thereof would not avoid or inhibit separation of the deeply embedded root. The design patents to Futami, U.S. Pat. No. Des. 222,689, Dec. 7, 1971 and Senchak, U.S. Pat. No. Des. 206,544, Dec. 27, 1966 which are said to illustrate weed pullers disclose long nose plier jaws which *obviously are subject to the same criticism that apply to the Holmes and Conzett structures. It is noted that Futami discloses a claw element at the end of one handle arm. It is also noted that the transplanter of Gross, U.S. Pat. No. 293,652, Feb. 19, 1884, which in part operates like a post-hole digger, has handle ends which are described as trowels or spades.

The following patents only broadly relate to the instant invention:

Sperry et al, U.S. Pat. No. 672,654, Apr. 23, 1901 for a shop type plier with jaws adaptable to receive an insert, and illustrates a ticket punch insert;

Hale, U.S. Pat. No. 233,410, Oct. 19, 1880, shows a fruit or flower cutter and gatherer plier type tool having serrated jaw face inserts;

Kroto, U.S. Pat. No. 1,980,759, Nov. 13, 1934, resiliently covered tong jaws; and Fauteux, U.S. Pat. No. 3,135,034, June 2, 1964, which discloses a clothes pin having rubber or rubber-like face pads.

None of the above noted patents is adapted to, or obviously combinable to, solve the problems encountered when attempting to remove the full growth of the well rooted weed or grass as described.

OBJECTS OF THE INVENTION

Therefore, it is an object of the invention to provide an implement especially adapted for removal of all growth as described and including the entire root thereof.

It is a further object of the invention to provide an implement as described and including plural adjuncts such as a spade or trowel element and a hoe or rake element.

It is a further object of the invention to provide a composite tool as described above which has a unitary purpose and wherein the element tools are interdependent or related in use whereby to adequately expose the deeply embedded root, grasp and remove the entire root and to return the soil.

It is another object of the invention to provide the implement with plier jaws having yieldable rubber or plastic face pads whereby to inhibit separation of the weed or grass parts due to crushing, tearing or cutting and to assure full root removal by uniform distribution of tensile forces.

It is yet another object of the invention that the face pads be removable and replaceable.

The nature and objects of the invention is more fully disclosed by reference to the following detailed description, the claimed subject matter and the illustrative drawings herewith.

DETAILED DESCRIPTION

Figure 1:
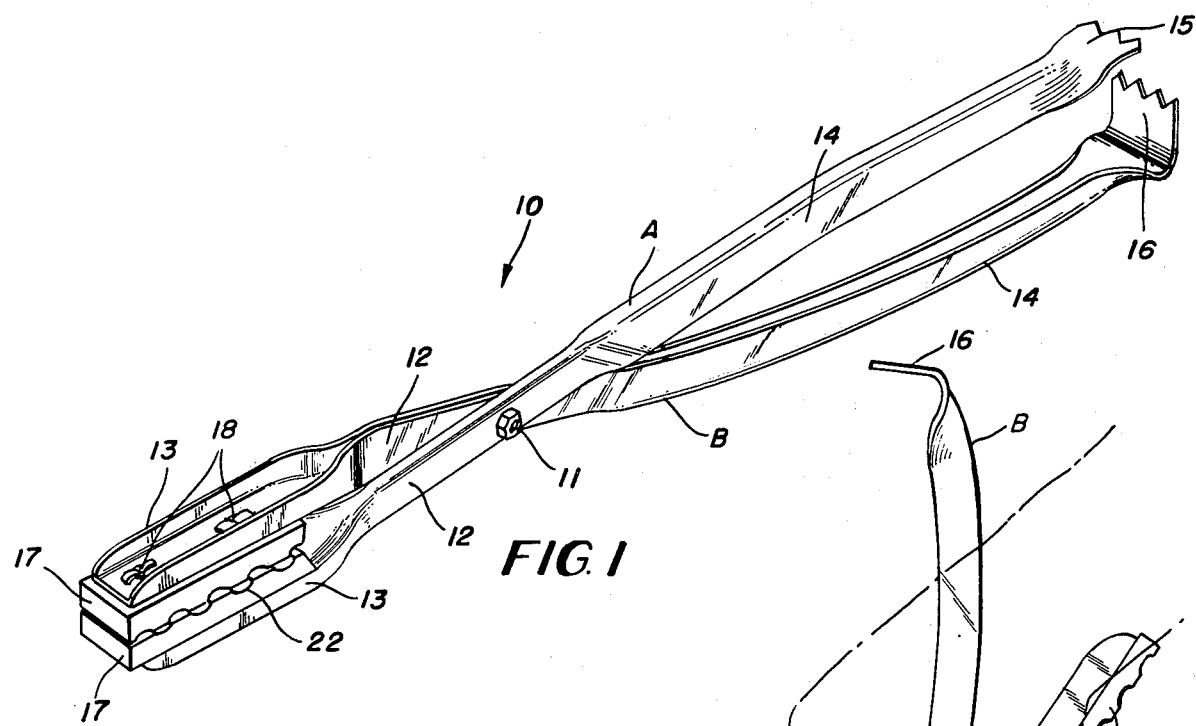
FIG. 1 is a perspective view of one form of the invention.

Reference to FIG. 1 discloses a perspective view of the composite tool 10 that is illustrative of one form of the invention. The tool is plier-like, having crossed arms A and B which pivot about an axis 11 through and normal to generally flat plate sections 12. The arms A and B each have relatively elongated jaws 13 and handles 14 at opposite ends thereof. The jaws and handles have each a substantial transverse dimension with respect to said plates. Each handle arm has a tool element at the free end thereof: a spade or trowel type 15 on one arm and a hoe or rake type 16 on the other arm. Although the tool elements 15,16 are shown as being toothed or serrated, it is understood that these elements may be variously configured in conventional design. Thus the spade or trowel type tool element 15 may comprise an arcuate panel having a frontal point and the tool element 16 may either be straight edged or have tines.

As further shown, the implement thus far described is channeled along its major extent but obviously may be variously configured in cross-section, and may either be a molded product or fabricated from sheet metal. It may be of singular construction or the tool elements 15,16 may be add ons. Once being presented with the inventive concept herein, it is believed that these alternatives as well as others, would be obvious.

Figure 5:
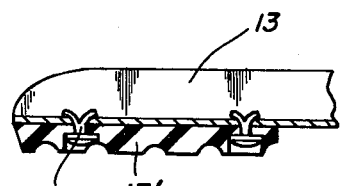
FIG. 5 is a partial side sectional view of a jaw with one type of pad.
Figure 6:
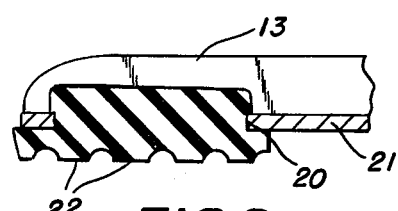
FIG. 6 is a partial side sectional view of a jaw with an alternate form of pad.
Figure 7:
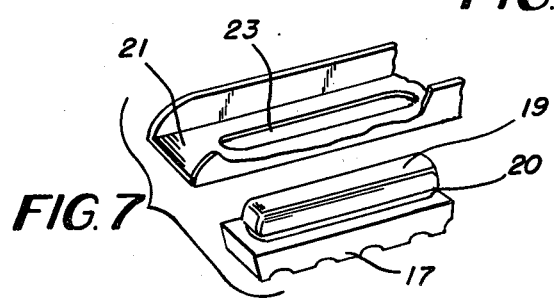
FIG. 7 is an exploded view of the jaw with an alternate pad.

A novel and material aspect of the invention is the particular provision of means whereby to grasp a root section firmly but without crushing, cutting or tearing and to exert a generally evenly distributed pulling force for removal thereof. This is accomplished by the use of relatively soft, molded rubber or plastic face pads 17 on said jaws. These pads may each comprise a simple plate 17' retained by conventional fasteners 18, as in FIG. 5 or may as in FIGS. 6 and 7, include a projecting back piece 19 having a locking groove 20 which associates with and into which fits the aperture defining portion 23 of the base plate 21 of the jaw channel. It is within the invention concept that the projecting back piece 19 be fabricated without the positive locking groove 20 and may be attached with a press fit.

To further enhance grasping of the root to be extracted and without crushing, cutting, tearing or slippage, the associated pad faces have transverse corrugations 22 which mesh with one another so as to present a sinuous extent for root contact. These corrugations may be somewhat rounded and of variable depth depending for best results on the handiness of the pad material.

Figure 2:
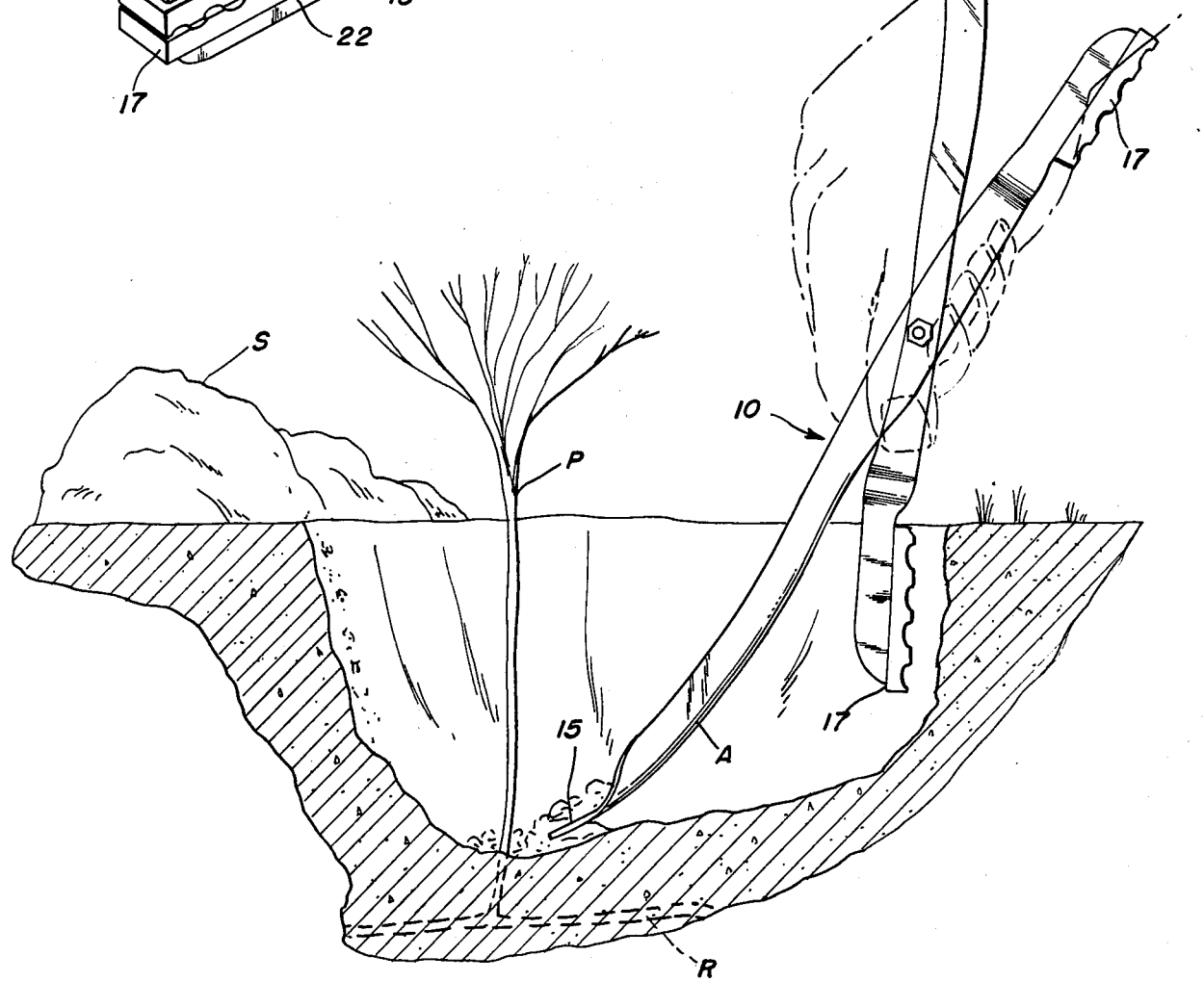
FIGS. 2, 3 and 4 are perspective views of the implement in various aspects of use.

As shown in FIG. 2, the implement 10 is initially utilized as a digging tool, using the trowel or space element 15 to clear away soils and debris from around the substantial depth of the well embedded root R to be removed. Where the soil is packed to resist digging and scraping, then digging is facilitated by bearing down on the end of the digging arm extended: i.e., at the end of the associated jaw member. In such latter instance, the pad end provides comfort to the force applying member and allows the application of greater pressure by the user. In this connection, it is pointed out that the pad ends illustrated are not delimiting as to construction but may be additionally configured to cover the end face of the handle arm. Thus, it is illustrated that the composite implement invented is not a construction of separate and independent and unrelated tools but rather that it comprises in its principle use a singular purpose unitary instrument of interdependent and related tools.

Figure 3:
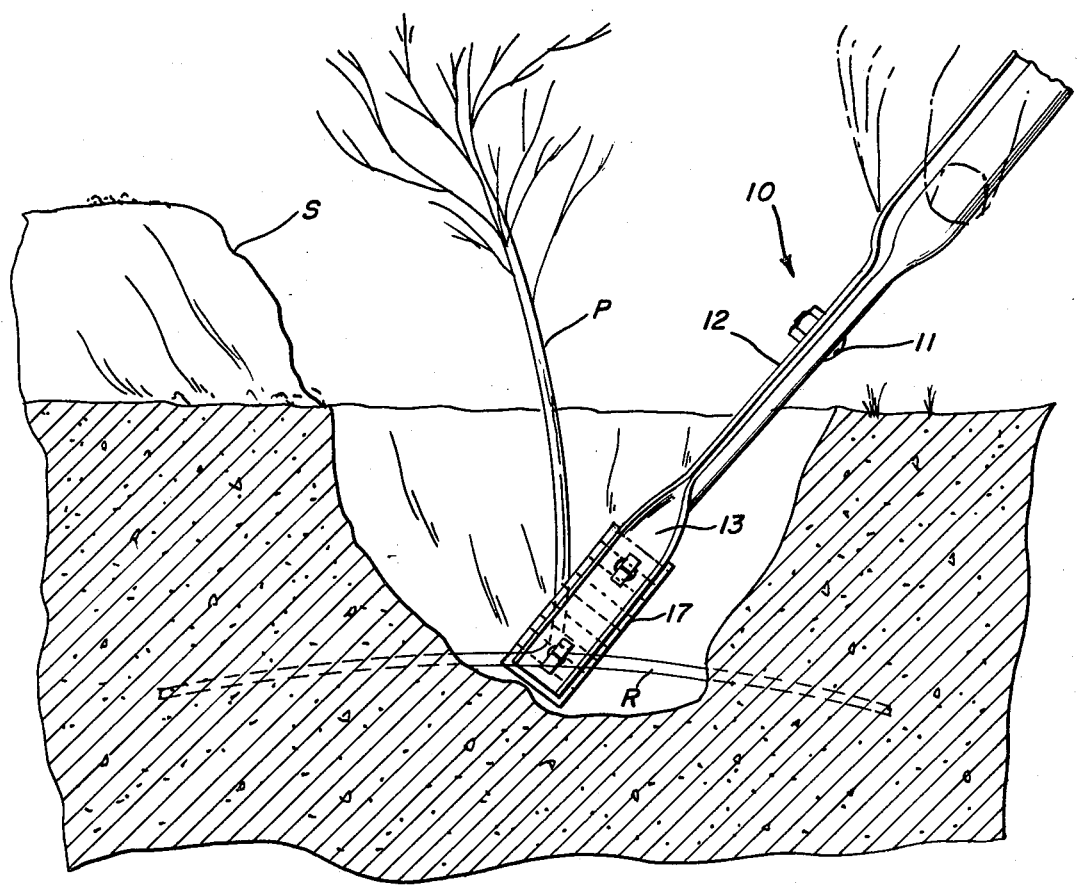
Figure 4:
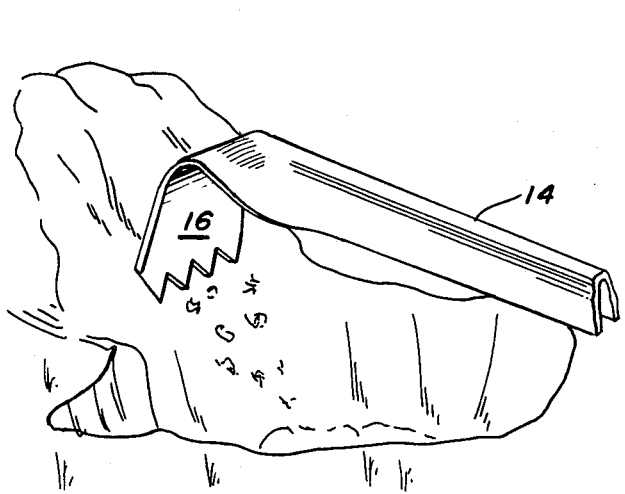

After having completed the step of at least substantially exposing the root system, the implement is used as a plier extractor, as shown in FIG. 3, to firmly and yet relatively gently grasp and withdraw the root.

Finally, the hoe or rake element is utilized to return the soil and dress the ground surface.

While in the foregoing there has been described and shown a preferred embodiment of the invention, various modifications and equivalents may be resorted to within the spirit and scope of the invention as claimed.

What is claimed is:

1. An implement for removing relatively deeply embedded weeds and unwanted grasses and the like comprising:
   an elongated plier-type tool having elongated jaws and operatively associated molded pads of relatively soft rubber or plastic mounted on the jaw faces;
   said pads having operatively associated corrugated faces whereby to inhibit slippage and to present a sinuous extent for root contact to enhance grasping of the root to be extracted without crushing, cutting or tearing and to facilitate extraction of the entire root;
   the tool handles being elongated and each handle having an auxiliary tool at the free end thereof; and
   one said auxiliary tool comprising a spade or trowel-like tool and the second auxiliary tool comprising a hoe or rake-like tool;
   all of said tools complementing one another for the common purpose of exposing and removing in entirety the relatively deeply embedded root and to dress the ground surface after such removal.

2. An implement as in claim 1 wherein each pad has a projecting back piece which is disposed in locking relationship in an aperture located in the jaw plate.

3. An implement as in claim 2 wherein the pads are each retained by a press fit of the back piece within the associated jaw plate aperture.

4. An implement as in claim 3 wherein the back piece has a locking groove thereabout which associates with, and into which fits, the aperture defining portion of the jaw plate.

5. An implement as in claim 1 wherein the relatively soft pads extend beyond the elongated jaws whereby to provide a bearing surface to comfort the force applying hand member and to facilitate digging and scraping of packed soil.

* * * * *